Dec. 18, 1956  J. R. DADO  2,774,366
TEMPERATURE-RESPONSIVE CHECK VALVE
Filed Sept. 24, 1954

INVENTOR.
John R. Dado
BY
Everett A. Johnson
ATTORNEY

United States Patent Office 2,774,366
Patented Dec. 18, 1956

2,774,366

TEMPERATURE-RESPONSIVE CHECK VALVE

John R. Dado, Whiting, Ind., assignor to Standard Oil Company, Chicago, Ill., a corporation of Indiana Application September 24, 1954, Serial No. 458,053

3 Claims. (Cl. 137—75)

This invention relates generally to valves and, more particularly, to check valves for preventing the flow of fluid in one direction in an impulse line associated with self-regulating, pressure-responsive valve control.

Flammable fluids acting directly on the diaphragm on pressure-regulating valves are a definite safety hazard in the event of diaphragm rupture. This is especially true in hot oil service where the original break progresses rapidly. Heretofore, diaphragms have been replaced frequently as a preventative measure but failures nevertheless occur. Likewise, restriction orifices have been used in impulse lines to minimize the possible leakage, but such orifices do not eliminate the hazard.

A problem also exists in connection with impulse lines connected to vessels containing fluidized solids. Ordinarily, bleed air is introduced into the instrument impulse line resulting in a positive flow of gasiform fluid toward the vessel on which the measurement is being made. However, if the bleed-in air supply should fail, there is a backflow of hot solids-containing gases into the impulse line, which backflow may result in considerable damage.

It is, therefore, an object of my invention to provide a check valve system which will protect an instrument impulse line associated with hot fluid lines. Another object of the invention is to provide a novel check valve which is of improved construction whereby the check is inoperative until an abnormal situation associated with heat arises. A more specific object is to provide a construction whereby the check valve becomes operative to prevent the backflow of fluid only after the backflowing fluids have heated the check valve means to a selected extent.

These and other objects of my invention will become apparent as the description thereof proceeds by reference to the accompanying drawing which forms a part of this specification and wherein.

Figure 1:
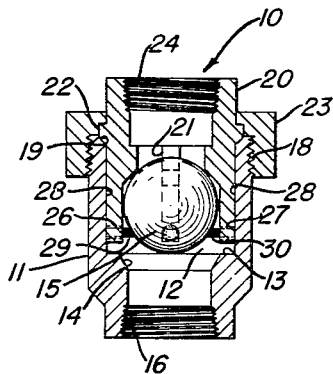
Figure 1 is an elevation, partly in section, illustrating one embodiment of the invention.

Figure 1 illustrates a form of my excess temperature shutoff valve 10 for use on direct pressure-operated control valves. The check valve comprises a main body or casing 11 having a valve chamber 12 provided with an interior annular shoulder 13 which is beveled to form a seat 14 for the ball check 15. The end of the casing 11 below the flange 13 is provided with internal threads 16 for connection to the impulse line 17.

The upper end of the casing 11 is provided with external threads 18 and a beveled end 19 adapted to support the sleeve 20. The sleeve 20 is formed with ribs 21 which are peripherally spaced and which guide the ball check 15 while permitting flow of fluids between the ribs 21 and about the ball check 15. The sleeve 20 is provided with an external shoulder 22 which co-operates with the coupling ring 23 to retain the sleeve 20 within the housing 11. The sleeve 20 is provided with internal threads 24 for connection with another portion of the impulse line 17a.

Two drilled and tapped bores 26 and 27 in the wing guides 28 receive threaded bismuth alloy pins 29 and 30 to prevent the ball check 15 from seating or chattering under normal operating conditions. If the diaphragm 31 in the valve 32 begins to leak, the cold oil normally standing in the dead-end of impulse line 17 bleeds out through the diaphragm 31 and the fresh hot oil immediately flowing melts the pins 29—30 allowing the check valve ball 15 to seat. The particular alloy chosen for these pins should have a melting point of about 20° F. above the highest ambient temperature observed in the area of the control valve 32. If the impulse line 17 is very short, the conduction of heat from the main line 33 along the impulse line 17 can be minimized by inserting a heat-insulating section or the like (not shown) in the impulse line.

Figure 2:
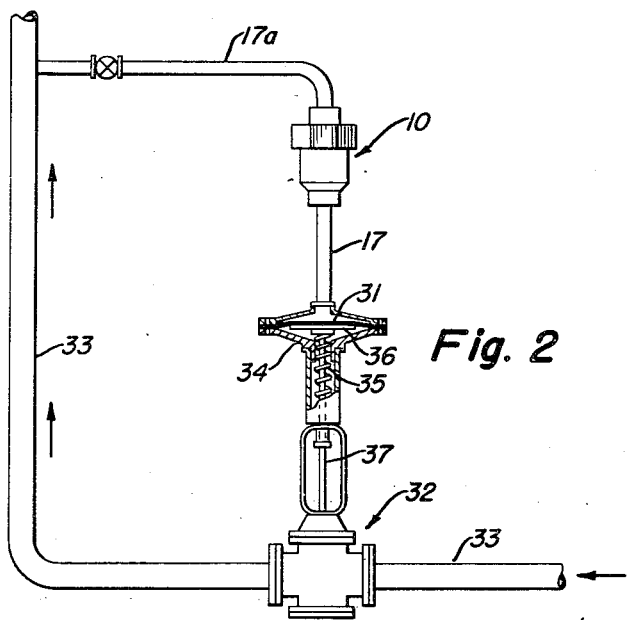
Figure 2 is a schematic view of a typical installation employing the check valve of Figure 1.

In Figure 2 I have illustrated a typical installation including flow line 33 having self-regulated control valve 32. An impulse line 17 extends from the flow line 33 to the diaphragm casing 34 on the valve 32. The impulse line 17 includes the check valve 10 which is of the construction shown in Figure 1.

As shown, the small pilot or impulse line 17 connects the upper diaphragm casing 34 with pipe line 33. Springs 35 are set at any desired operating pressure. When the selected pressure is reached in pipe line 33, the diaphragm plate 36 and the valve stem 37 is depressed against the action of the springs 35. Diaphragm 31, made of flexible material, passes over diaphragm plate 36 and is held between the upper and lower portions of diaphragm casing 34. When the pressure exerted on the diaphragm 31 overcomes the force of springs 35, the pressure-controlled closure members within valve 32 are opened proportionately.

Should the diaphragm 31 rupture, there is flow through impulse line 17 through the diaphragm casing 34 and into the adjacent area. When this happens, the low melting pins 26—27 collapse thereby allowing the valve check 15 to move into a tight shutoff with a minimum spilling of hot oil from the impulse line installation or control valve 32.

Figure 4:
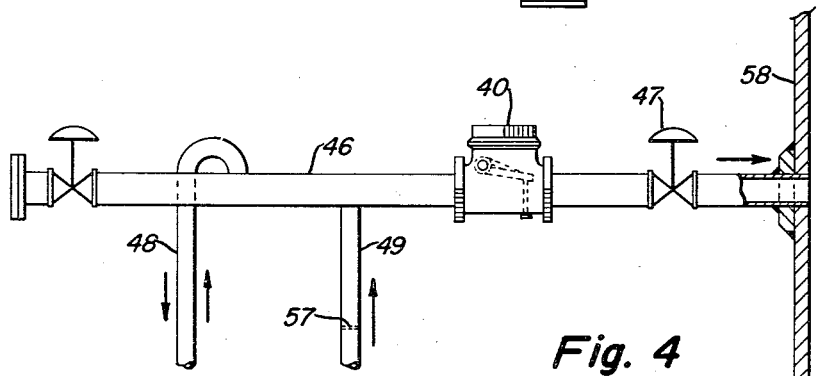
Figure 4 is a schematic view of a typical installation employing the swing check of Figure 3.
Figure 3:
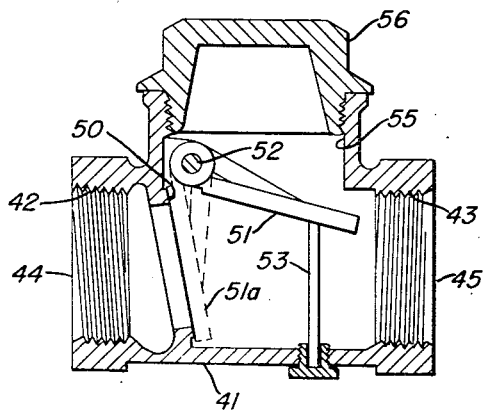
Figure 3 is a vertical section of a swing check valve constructed according to my invention.

Figures 3 and 4 illustrate another embodiment of my invention in another type of installation. The wing check 40 includes an open-ended body 41 having internal threads 42 and 43 at the normal inlet 44 and outlet 45 thereof to permit its being interposed in the stub end conduit 46. In this way, the body 41 constitutes part of the conduit 46 and is in series with the primary check 47 as well as the impulse line 48 and the air bleed line 49.

A beveled annular seat 50 surrounds the inlet 44 and a closure member or plate 51 is adapted to engage the seat 50. The plate or disc 51 is mounted on shaft 52 within the body 41 to occupy the open and closed positions relative to the seat 50 as indicated in broken and full lines in Figure 3. The open position is maintained by the fusible pin 53 which may be threaded into and extend through the wall of the body 41.

The fusible pins may be of a bismuth alloy or other suitable material which has a melting point of about 20° above the normal operating temperature of the check valve. It is not necessary, however, that the entire pin be fusible, it being sufficient that the upper or plate-engaging end be so constructed.

The body 41 is provided with an upper opening 55 through which access may be had to the closure 51, the shaft 52 and pin 53. This opening 55 is normally closed by a screw cap 56 having a wrench-receiving head.

In Figure 4, the instrument or impulse line 48 is connected to the stub end conduit 46 into which bleed air is introduced via line 49, check valve 40 and primary block 47. On air line 49, I may provide a self-cleaning restriction orifice 57. As long as the bleed air is flowing through the check valve 40 into the vessel 58, the check valve 40 will stay in a wide-open position, the check being held open by fusible pin 53. In the event of an upset with no flow of cool gasiform fluids into the vessel 58 through duct 46, the temperature of the check valve 40 is increased by conduction through duct 46 from vessel 58 thereby causing the fusible pin or prop 53 to collapse and permit the closing of the check plate 51 to prevent any backflow of gasiform fluids and suspended catalyst. When the difficulty has been corrected, the fusible pin 53 can be replaced by another and the check valve 40 again made sensitive to excess temperature.

In the operation of the wing check valve 40 of Figures 3 and 4, it will be clear that the valve 40 is installed so that the closure member 51 will close and prevent the backflow of gasiform fluids in duct 46 but that the fusible pin 53 must first be caused to release the check disc 51. Thus, when flow of cool gases ceases, the pin 53 will be melted and the disc 51 will gravitate to its closed position 51a shown in dotted lines in Figure 3 so that any back pressure or flow will act upon the disc 51 to urge the latter in sealing engagement with its seat 50.

From the above, it will be apparent that I have provided a novel means for constructing and operating a check valve system which is sensitive to excess temperatures. In each illustrated embodiment, the operation is similar. The valve includes a hollow body having an inlet and an outlet with a closure seat intermediate the inlet and outlet and a disc closure supported within the body adjacent the closure seat, such support being by means of a fusible prop which under operating conditions is melted or fused so as to release the closure and permit it to seat.

In addition to the fusible props described above, I may employ other types of low-melting supports such as, for example, a false seat made of rose metal or other alloy or a fusible plastic which is not soluble in the fluid normally maintained within the valve body. Likewise, the prop or support for the wing check may be a depending support instead of an upstanding support as illustrated in the drawings.

Although I have described my invention with reference to particular embodiments and particular installations employing such embodiments, it should be understood that this is by way of illustration only and that modifications may be made by those skilled in the art without departing from the spirit of my invention.

What I claim is:

1. An excess temperature shutoff valve for use on an impulse line for direct pressure-operated control valves which comprises in combination a generally cylindrical casing, conduit engaging means at opposite ends of said casing, a ribbed sleeve slidably positioned within said casing, a ball check within said casing, a plurality of low melting restraining pins carried by the downstream ends of the ribs of said sleeve and restraining said ball check within said sleeve under normal operating temperature conditions, fluid flow channels in said sleeve permitting flow about said ball check when restrained by said pins, a valve port adjacent the downstream end of said casing below said sleeve and adapted to be closed by said ball check to prevent flow through said casing when said restraining pins are deformed by hot fluids passing successively through said flow channels and through said valve port in said casing, and coupling means external of said casing for retaining said sleeve within said casing.

2. A temperature-sensitive check valve of the gravity ball type which comprises an elongated hollow body, a port in a lower portion of said body, a ball check for controlling flow through said port, a ball-guiding ribbed sleeve above said port and fixed within said body, prop means carried by said ribs near the lower ends thereof supporting said ball within said sleeve above said port in a fixed position, said spaced ribs providing flow channels around said ball check, and said prop means being displaced by flow of hot fluid successively through said channels and said port whereby said ball check is released to seal said port.

3. A temperature-sensitive check valve of the movable ball type which comprises separable first and second tubular sections, said first section being adapted to receive said second section, coupling means external of said housing securing said first and second sections in fluid tight arrangement, first port means in the first of said sections adapted for threaded engagement with a line, second port means in the second of said sections adapted for threaded engagement with a line, a plurality of longitudinally extending ribs within said second section and substantially coextensive with the lower portion thereof, said ribs providing a ball-guiding means within said housing, and temperature responsive restraining props removably fixed to the said ribs and normally restraining said ball check and preventing its seating across the outlet port in said first section, whereupon failure of said diaphragm permits flow of fluid from said line through said housing and continued flow therethrough causing the collapse of said restraining props thereby permitting said ball check to position itself across said outlet port and prevent further flow through said line.

References Cited in the file of this patent

UNITED STATES PATENTS

| | | |
|---|---|---|
| 369,474 | Schmidt | Sept. 6, 1887 |
| 1,510,813 | Williams | Oct. 7, 1924 |
| 2,026,704 | Petroe | Jan. 7, 1936 |
| 2,128,292 | Finn | Aug. 30, 1938 |
| 2,296,135 | Batson | Sept. 15, 1942 |
| 2,589,581 | Sokolik | Mar. 18, 1952 |
| 2,707,965 | Allen | May 10, 1955 |

FOREIGN PATENTS

| | | |
|---|---|---|
| 278,927 | Great Britain | Oct. 20, 1927 |
| 536,051 | Great Britain | May 1, 1941 |